United States Patent
Harry et al.

(10) Patent No.: US 9,101,199 B1
(45) Date of Patent: Aug. 11, 2015

(54) MAX PET CARRIER SYSTEMS

(71) Applicants: Nandinie Harry, East Elmhurst, NY (US); Vishal Bhagwandin, East Elmhurst, NY (US); Alexander Bhagwandin, East Elmhurst, NY (US)

(72) Inventors: Nandinie Harry, East Elmhurst, NY (US); Vishal Bhagwandin, East Elmhurst, NY (US); Alexander Bhagwandin, East Elmhurst, NY (US)

( * ) Notice: Subject to any disclaimer, the term of this patent is extended or adjusted under 35 U.S.C. 154(b) by 0 days.

(21) Appl. No.: 14/201,895

(22) Filed: Mar. 9, 2014

Related U.S. Application Data

(60) Provisional application No. 61/783,071, filed on Mar. 14, 2013.

(51) Int. Cl.
| | |
|---|---|
| A45F 4/02 | (2006.01) |
| A01K 1/00 | (2006.01) |
| A45F 3/02 | (2006.01) |
| A45F 3/04 | (2006.01) |

(52) U.S. Cl.
CPC .................. *A45F 4/02* (2013.01); *A01K 1/0035* (2013.01); *A01K 1/0064* (2013.01); *A45F 3/02* (2013.01); *A45F 2003/045* (2013.01); *A45F 2004/023* (2013.01)

(58) Field of Classification Search
CPC ................................................ A45F 2004/006
USPC ......... 224/153, 583, 579, 627, 630, 651, 652, 224/653, 657, 660, 681; 119/497
See application file for complete search history.

(56) References Cited

U.S. PATENT DOCUMENTS

| | | | | |
|---|---|---|---|---|
| 4,424,841 A | * | 1/1984 | Smith | 224/240 |
| 4,995,436 A | * | 2/1991 | Cantor | 150/102 |
| 5,564,612 A | * | 10/1996 | Gregory | 224/633 |
| 5,743,447 A | * | 4/1998 | McDermott | 224/153 |
| 5,931,120 A | * | 8/1999 | Burns et al. | 119/497 |
| D420,792 S | * | 2/2000 | Sakelliou et al. | D3/216 |
| 6,286,461 B1 | * | 9/2001 | Martz | 119/497 |
| 6,460,746 B1 | * | 10/2002 | Amram | 224/579 |
| 6,701,871 B1 | * | 3/2004 | Johnson | 119/497 |
| D523,995 S | * | 6/2006 | Knittle | D30/109 |
| 7,152,772 B2 | * | 12/2006 | Ukitsu et al. | 224/660 |
| 7,210,426 B2 | | 5/2007 | Yeung | |
| 7,594,569 B2 | | 9/2009 | Bass | |
| 7,617,797 B2 | | 11/2009 | Lam | |
| 8,505,789 B2 | | 8/2013 | Green | |
| 8,590,759 B1 | * | 11/2013 | Mooney | 224/581 |
| 2002/0139820 A1 | * | 10/2002 | Godshaw et al. | 224/153 |
| 2003/0127060 A1 | * | 7/2003 | Yeung | 119/497 |
| 2004/0065708 A1 | * | 4/2004 | Amram | 224/579 |
| 2005/0040198 A1 | * | 2/2005 | Battaglia et al. | 224/610 |
| 2005/0103817 A1 | * | 5/2005 | Glankler | 224/583 |
| 2007/0095872 A1 | | 5/2007 | White | |
| 2007/0261977 A1 | * | 11/2007 | Sakai | 206/315.11 |
| 2009/0184144 A1 | * | 7/2009 | Kim | 224/258 |
| 2011/0278338 A1 | | 11/2011 | Darnell, II | |
| 2012/0006865 A1 | * | 1/2012 | Su | 224/153 |
| 2012/0292355 A1 | | 11/2012 | Olson | |

* cited by examiner

Primary Examiner — Justin Larson
Assistant Examiner — Lester L Vanterpool
(74) Attorney, Agent, or Firm — RG Patent Consulting, LLC; Rachel Gilboy

(57) ABSTRACT

A supply backpack with detachable pet carrier system to increase the convenience of simultaneously transporting pets and provisions. Max Pet Carrier Systems is a versatile supply backpack with detachable pet carrier system having a wearable pack with shoulder straps and an attachable pet carrier with a removable tote strap. By enclosing a pet within a carrier and attaching the carrier to a pack, a user is able to quickly and efficiently pack and transport the pet and any necessary supplies. Such a convenient transport system is especially useful in emergency evacuation situations.

16 Claims, 5 Drawing Sheets

MAX PET CARRIER SYSTEMS

CROSS-REFERENCE TO RELATED APPLICATION

The present application is related to and claims priority from prior provisional application Ser. No. 61/783,071, filed Mar. 14, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of transport devices and more specifically relates to supply backpacks or go-bag with detachable pet carriers.

2. Description of the Related Art

Many individuals in modern society enjoy the companionship of one or more pets. Often pets become beloved members of an owner's family, making their health and safety top priorities for owners. Traveling can be stressful for a pet, making the pet unpredictable and difficult to control. An upset pet often causes an owner unwanted difficulties when transporting the pet. Gathering supplies needed to care for both a pet and its owner can be time-consuming, and a risk exists in potentially forgetting or misplacing an item necessary to the comfort and/or survival of the pet, the owner, or both. Emergency situations such as those requiring evacuations tend to escalate anxiety associated with collecting and transporting beloved pets and important supplies, thereby increasing the likelihood of forgetting a critical element. In such an emergency situation, individuals having to simultaneously control a pet, transport supplies, and flee to safety often find themselves in a precarious position.

Various attempts have been made to solve the above-mentioned problems such as those found in U.S. Pat. Nos. 7,617,797; 2011/0278338; 7,594,569; 6,286,461; 2007/0095872; 6,701,871; 7,210,426; 8,505,789; and 2012/0292355. This prior art is representative of transport devices. None of the above inventions and patents, taken either singly or in combination, is seen to describe the invention as claimed.

Ideally, a hands-free supply backpack or go-bag with a detachable pet carrier should be versatile, durable, user-friendly and, yet, would operate reliably and be manufactured at a modest expense. Thus, a need exists for a reliable supply backpack with detachable pet carrier system to increase the convenience of simultaneously transporting pets and provisions and to avoid the above-mentioned problems.

BRIEF SUMMARY OF THE INVENTION

In view of the foregoing disadvantages inherent in the known transport device art, the present invention provides a novel supply backpack with detachable pet carrier system. The general purpose of the present invention, which will be described subsequently in greater detail, is to provide convenient simultaneous transport of pets and provisions.

A supply backpack with detachable pet carrier system is disclosed herein preferably comprising: a pack and at least one carrier. The pack comprises an outer shell, an interior volume, and a plurality of adjustable and removable carrying straps. The carrier comprises an outside casing, an inner void, and a plurality of adjustable and removable tote straps. Ideally, a pet may be secured within a carrier, and the carrier may be secured to the pack in order for a user to conveniently protect and transport the pet and various supplies.

The packs outer shell is defined by: a forward wall, a rear wall, a right wall, a left wall, a bottom surface, and a top surface—the joining of which effectively defines the interior volume. In preferred embodiments, the forward wall of the pack is releasably engageable with at least one of: the rear wall, the right wall, the left wall, the top surface, and/or the bottom surface in such a manner as to essentially seal the pack. Alternatively, the forward wall may be disengaged in order to allow a user access to the interior volume of the pack. For storage purposes, the pack comprises a plurality of both interior storage compartments and exterior anchoring elements.

The carrier's outside casing is defined by: a front face, a back face, a right face, a left face, a bed, and an upper face—the joining of which effectively defines the inner void. The upper face and/or front face of the carrier are each releasably engageable with at least one of: the back face, the right face, the left face, and/or the bed in such a manner as to essentially seal the carrier. Alternatively, the upper face and/or front face may be disengaged in order to allow a user access to the inner void of the carrier. Ideally, the carrier is removably attachable to the pack via at least one connector—the bed of the carrier having an attacher, and the top surface of the pack comprising a lip having a receiver. The lip effectively secures and stabilizes the carrier atop the pack.

The carrier comprises a plurality of ventilation apertures for providing fresh air and viewing portals for a pet enclosed therein. In order to calm and protect a pet enclosed within the carrier, these ventilation apertures may be covered and/or sealed by at least one of a plurality of retractable flaps attached to at least one of: the front face, the back face, the right face, the left face, and alternately the upper face of the carrier. In order to secure any retracted flap, the carrier additionally comprises a plurality of fasteners.

A method of using the supply backpack with detachable pet carrier system is also described herein preferably comprising the steps of: securing a pet within a carrier; connecting the carrier to a pack; and wearing the pack for a period of use. The method preferably further comprises the steps of: removing the carrier from the pack; releasing the pet from the carrier; and reconnecting the carrier to the pack for storage until further use.

The present invention holds significant improvements and serves as a transport device system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Max Pet Carrier Systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a transport device and more particularly to a Max Pet Carrier System as used to improve the convenience of simultaneously transporting pets and provisions.

Figures 1A, 1B:
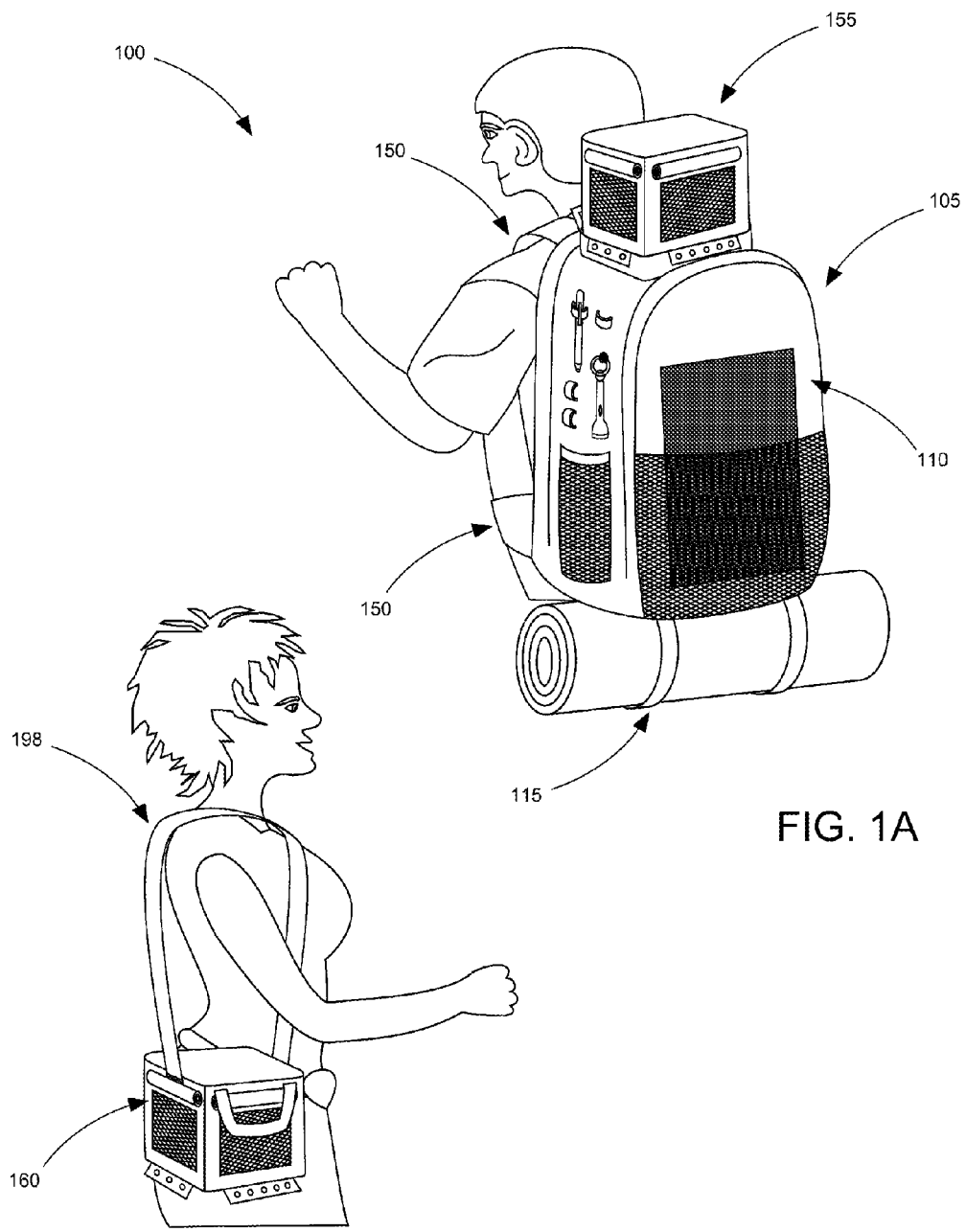
FIGS. 1A and 1B show perspective views illustrating a supply backpack with detachable pet carrier system according to an embodiment of the present invention.

Referring now to the drawings by numerals of reference, there are shown in FIGS. 1A and 1B perspective views illustrating supply backpack with detachable pet carrier system 100 according to an embodiment of the present invention.

Supply backpack with detachable pet carrier system 100 preferably comprises: pack 105 and at least one carrier 155, wherein carrier 155 is preferably removably attachable to pack 105 so as to allow a user to secure a pet within carrier 155 and secure carrier 155 to pack 105 in a manner that provides protection and transport of the pet for a duration of at least one use. Within this particular embodiment, supply backpack with detachable pet carrier system 100 preferably comprises a single carrier 155 removably attachable to pack 105. In other embodiments, a plurality of carrier(s) 155 may be used to secure multiple pets. Also within this embodiment, pack 105 preferably comprises outer shell 110 having a cushioned back support; interior volume 145; and a plurality of carrying strap(s) 150. Also within this embodiment, carrier 155 preferably comprises outside casing 160; inner void 195; and a plurality of tote strap(s) 198.

Within this particular embodiment shown, each carrying strap 150 and each tote strap 198 may preferably be both adjustable and removable from pack 105 and carrier 155, respectively. In other embodiments, each carrying strap 150 and each tote strap 198 may be permanently affixed to pack 105 and carrier 155, respectively. Alternately, a mix of permanently-affixed and releasably-attachable carrying strap(s) 150 and tote strap(s) 198 may be used, according to the preferences and needs of a user.

Carrying strap(s) 150 of the present embodiment may preferably comprise: at least one padded waist belt; and dual cushioned shoulder belts arranged in a manner so as to allow a user to wear one or both carrying strap(s) 150 over one or both shoulders in order to facilitate transport of pack 105. Tote strap(s) 198 of the present embodiment may preferably comprise: a single cushioned shoulder belt; and at least one, but preferably two, hand-held handles. Within the present embodiment, each tote strap 198 may preferably be releasably attachable to carrier 155 via clips, lobster clasps, snaps, buttons, or similar attachment means. In other embodiments, each carrying strap 150 and each tote strap 198 may comprise any of a number of various types of straps, belts, hand-held handles, chest straps, retractable straps, and the like. Those with ordinary skill in the art will now appreciate that upon reading this specification and by their understanding the art of transport devices as described herein, methods of constructing and attaching straps and handles of transport devices will be understood by those knowledgeable in such art.

Carrying strap(s) 150 and tote strap(s) 198 of the present embodiment may preferably be releasably attachable to pack 105 and carrier 155, respectively, in such a manner as to allow the configuration of the attachment of carrying strap(s) 150 and tote strap(s) 198 to be altered according to the needs and preferences of a user. Additionally, pack 105 may preferably comprise any number of bedding belt(s) 115. Pack 105 of the present embodiment preferably comprises two bedding belt(s) 115 to effectively secure bedding such as sleeping bags, blankets, foam pads, and the like to pack 105 for transport. Upon reading this specification, it should be appreciated that, under appropriate circumstances, considering such issues as user preferences, design preference, structural requirements, marketing preferences, cost, available materials, technological advances, etc., other strap and belt arrangements such as, for example, ties, elastomeric bands, hook-and-loop fasteners, etc., may be sufficient.

Supply backpack with detachable pet carrier system 100 of the present embodiment preferably accommodates small pets, and in other versions it may accommodate medium and/or large pets. Also within the present embodiment, tote strap(s) 198 may preferably be attached to carrier 155 to facilitate transport of carrier 155 independently of pack 105 and may be removed from carrier 155 when carrier 155 is connected to pack 105. In this way, carrier 155 may be independently used to transport a pet in a motor vehicle, in an airplane cabin, on public transit vehicles, and the like. In other embodiments, supply backpack with detachable pet carrier system 100 may comprise pack 105 having integral carrier 155 as opposed to a removably-attachable carrier 155.

Figure 2:
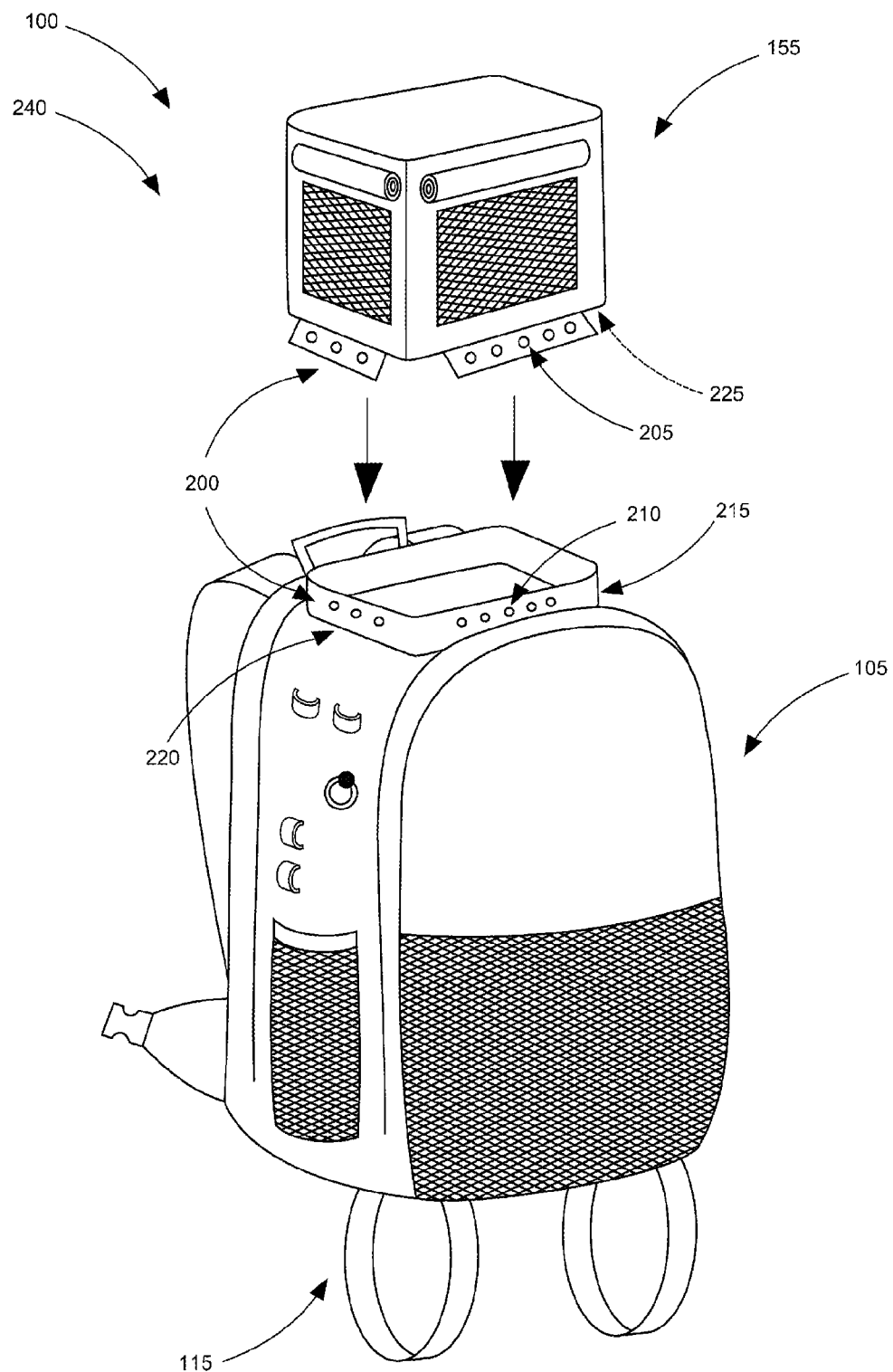
FIG. 2 is a perspective view illustrating the supply backpack with detachable pet carrier system according to an embodiment of the present invention of FIGS. 1A and 1B.

Referring now to FIG. 2, a perspective view illustrating supply backpack with detachable pet carrier system 100 according to an embodiment of the present invention of FIGS. 1A and 1B.

Supply backpack with detachable pet carrier system 100 may preferably comprise: pack 105 having top surface 220 and carrier 155 having bed 225. Bed 225 of carrier 155 may preferably be removably coupleable to top surface 220 of pack 105 via at least one connector 200 having attacher 205 and receiver 210. In the present embodiment, connector 200 may preferably comprise snaps. Ideally, bed 225 of carrier 155 preferably comprises attacher 205, and top surface 220 of pack 105 may preferably comprise lip 215 having receiver 210. Upon reading this specification, it should be appreciated that, under appropriate circumstances, considering such issues as user preferences, design preference, structural requirements, marketing preferences, cost, available materials, technological advances, etc., other connecting and fastening arrangements such as, for example, side-release buckles, frame-and-prong buckles, hook-and-loop fasters, zippers, buttons, hook-and-eye closures, etc., may be sufficient.

In preferred embodiments, lip 215 essentially extends vertically from top surface 220 of pack 105 in a manner so as to effectively provide stability to the joining of carrier 155 and pack 105. Ideally, lip 215 matches bed 225 of carrier 155 in shape and may preferably be incrementally larger than bed 225 of carrier 155 in such a manner as to accommodate bed 225 of carrier 155 within the confines of lip 215. In this way, carrier 155 may be friction-fit within lip 215 when carrier 155 is attached to pack 105. In other embodiments, lip 215 may be collapsible and/or removable from pack 105 when carrier 155 is not attached to pack 105. In other embodiments, carrier 155 may be joined to pack 105 in alternate orientations/positions such as: beneath pack 105; along the left or right sides of pack 105; within pack 105; and the like. Those with ordinary skill in the art will now appreciate that upon reading this specification and by their understanding the art of transport devices as described herein, methods of constructing and connecting transport devices will be understood by those knowledgeable in such art.

Pack 105 and carrier 155 may preferably comprise waterproof nylon to protect both pets and supplies contained therein. Alternatively, water-resistant and non-waterproof materials may be used to construct pack 105 and carrier 155. In some embodiments, both pack 105 and carrier 155 may comprise molded rubber bases to protect the waterproof nylon from wear and tears. Both pack 105 and carrier 155 preferably comprise safety reflectors affixed to at least one, but preferably all, exterior surfaces of both pack 105 and carrier 155 to enhance the safety of a user. Upon reading this specification, it should be appreciated that, under appropriate circumstances, considering such issues as user preferences, design preference, structural requirements, marketing preferences, cost, available materials, technological advances, etc., other material component arrangements such as, for example, canvas, cotton, polyester, plastic, etc., may be sufficient. Those with ordinary skill in the art will now appreciate that upon reading this specification and by their understanding the art of transport devices as described herein, methods of constructing and waterproofing transport devices will be understood by those knowledgeable in such art.

Figure 3:
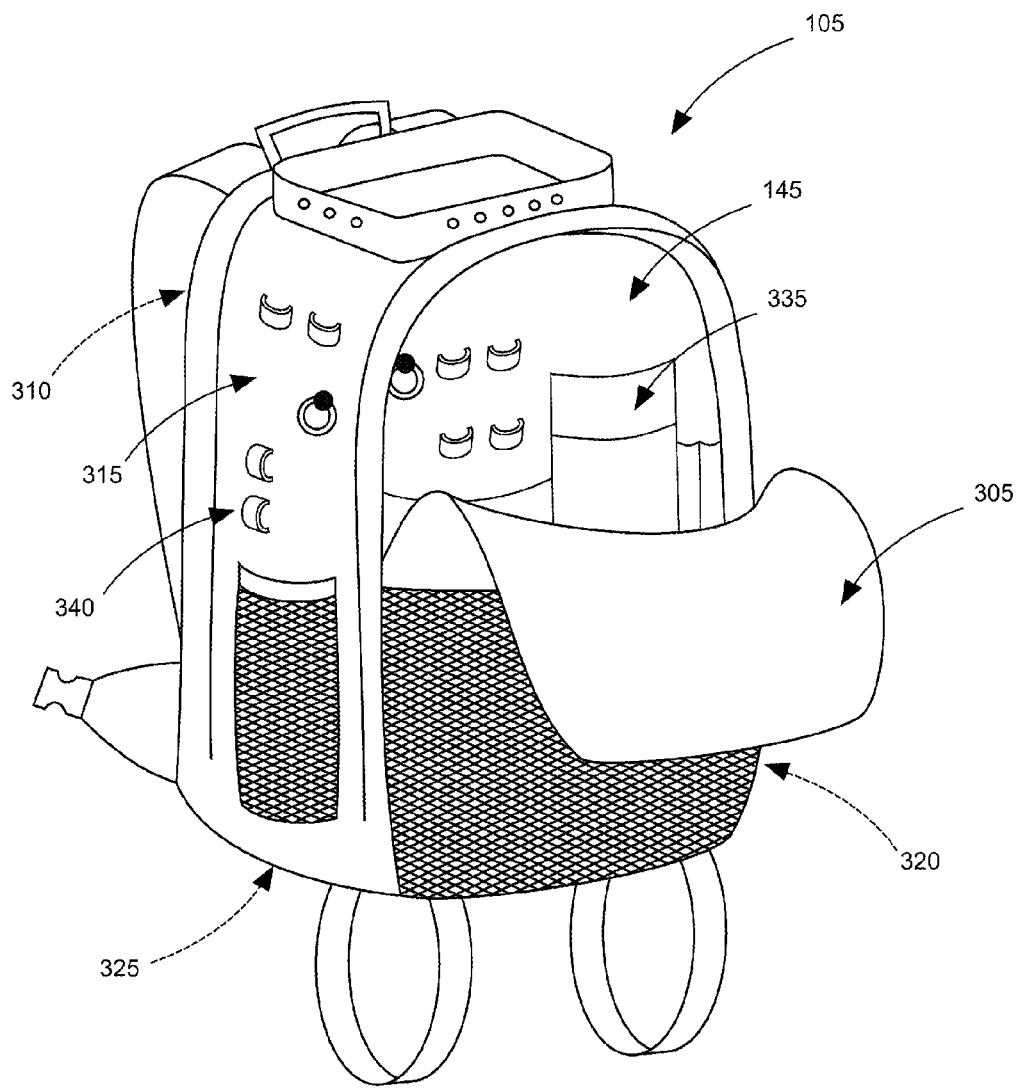
FIG. 3 is a perspective view illustrating the supply backpack with detachable pet carrier system according to an embodiment of the present invention of FIGS. 1A-2.

FIG. 3 is a perspective view illustrating supply backpack with detachable pet carrier system 100 according to an embodiment of the present invention of FIGS. 1A-2.

Pack 105 may comprise outer shell 110, which is preferably defined by forward wall 305, rear wall 310, right wall 315, left wall 320, bottom surface 325, and top surface 220. The joining of forward wall 305, rear wall 310, right wall 315, left wall 320, bottom surface 325, and top surface 220 preferably defines interior volume 145. Forward wall 305 of pack 105 may preferably be releasably engageable with at least one of: rear wall 310, right wall 315, left wall 320, bottom surface 325, and top surface 220. As such, the disengagement of forward wall 305 essentially creates an access point that allows a user access to interior volume 145 of pack 105. Forward wall 305 may preferably be releasably engaged using a zipper. Upon reading this specification, it should be appreciated that, under appropriate circumstances, considering such issues as user preferences, design preference, structural requirements, marketing preferences, cost, available materials, technological advances, etc., other fastening and securing arrangements such as, for example, hook-and-loop fasteners, snaps, buttons, hook-and-eye closures, etc., may be sufficient.

Interior volume 145 of the present embodiment may comprise a single chamber to provide storage for a user's supplies. In other embodiments, interior volume 145 may comprise a plurality of chambers. In some embodiments, an engagement of forward wall 305, rear wall 310, right wall 315, left wall 320, bottom surface 325, and top surface 220 may be interrupted in a plurality of locations in such a manner as to create a corresponding number of access points into a single chamber and alternately into a plurality of chambers of interior volume 145. Those with ordinary skill in the art will now appreciate that upon reading this specification and by their understanding the art of transport devices as described herein, methods of constructing transport devices will be understood by those knowledgeable in such art.

Pack 105 preferably comprises a plurality of storage compartment(s) 335 within interior volume 145 for storing and transporting supplies of various shapes and sizes. Pack 105 may also comprise storage compartment(s) 335 along any exterior surface of pack 105. Additionally, pack 105 preferably comprises a plurality of anchoring element(s) 340 along any exterior surface of pack 105 to secure supplies to pack. Pack 105 may also comprise anchoring element(s) 340 within interior volume 145. In preferred embodiments, pack 105 may also comprise an assortment of standard supplies with pre-assigned storage compartment(s) 335 each sized and shaped to accommodate its corresponding standard supply article. First aid kits, flashlights, space blankets, and the like may constitute the aforementioned standard supplies. Upon reading this specification, it should be appreciated that, under appropriate circumstances, considering such issues as user preferences, design preference, structural requirements, marketing preferences, cost, available materials, technological advances, etc., other fastening and securing arrangements such as, for example, mesh pockets, straps, clips, snaps, etc., may be sufficient. Those with ordinary skill in the art will now appreciate that upon reading this specification and by their understanding the art of transport devices as described herein, methods of constructing and compartmentalizing transport devices will be understood by those knowledgeable in such art.

Within this particular embodiment, pack 105 preferably assumes the size and shape of standard transport devices typically worn on the back of a user. In other embodiments, however, pack 105 may assume any of a plurality of alternate shapes and sizes, such as: duffle bag, messenger bag, suitcase, and the like. Similarly, carrier 155 of the present embodiment preferably assumes the shape of a small cube. In other embodiments, however, carrier 155 may assume any of a plurality of alternate shapes and sizes. In alternate embodiments, pack 105 and carrier 155 may comprise: wheels; telescoping handles; plastic, lightweight metal, foam, or inflatable support frames; and/or any similar enhancements to the function of supply backpack with detachable pet carrier system 100. Those with ordinary skill in the art will now appreciate that upon reading this specification and by their understanding the art of transport devices as described herein, methods of constructing transport devices will be understood by those knowledgeable in such art.

Figure 4A:
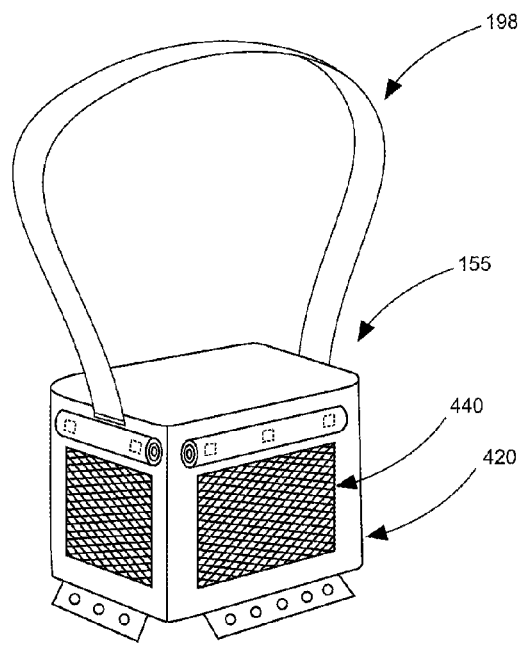
FIGS. 4A-4C are perspective views illustrating the supply backpack with detachable pet carrier system according to an embodiment of the present invention of FIGS. 1A-2.
Figure 4B:
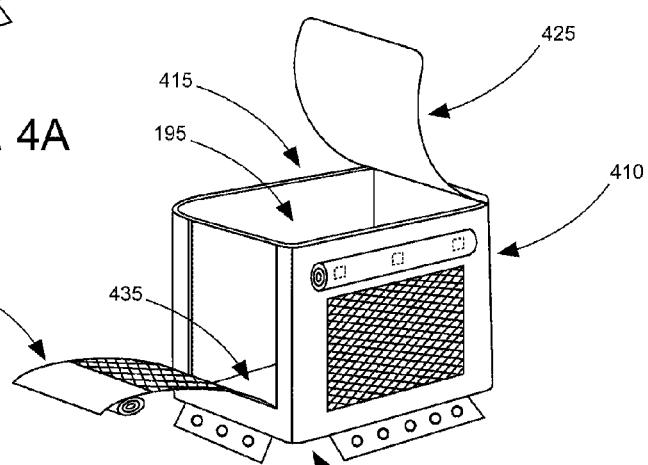
Figure 4C:
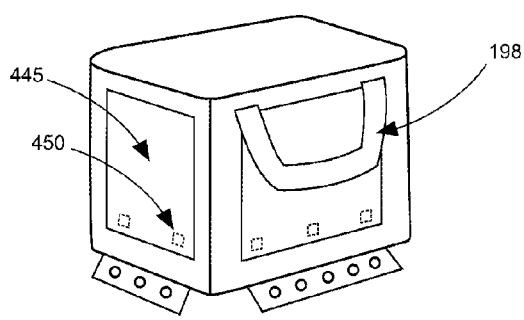

Referring now to FIGS. 4A-4C, perspective views illustrating supply backpack with detachable pet carrier system 100 according to an embodiment of the present invention of FIGS. 1A-2.

Carrier 155 may comprise outside casing 160, which is preferably defined by front face 405, back face 410, right face 415, left face 420, bed 225, and upper face 425. The joining of front face 405, back face 410, right face 415, left face 420, bed 225, and upper face 425 preferably defines inner void 195.

Upper face 425 and front face 405 may preferably be releasably engageable with at least one of: back face 410, right face 415, left face 420, and bed 225. As such, the disengagement of upper face 425, separately from or in combination with front face 405, essentially creates an access point that allows a user access to inner void 195 of carrier 155 to insert, tend to, and remove a pet from carrier 155. Upper face 425 and front face 405 may preferably be releasably engaged using a zipper. Upon reading this specification, it should be appreciated that, under appropriate circumstances, considering such issues as user preferences, design preference, structural requirements, marketing preferences, cost, available materials, technological advances, etc., other fastening and securing arrangements such as, for example, hook-and-loop fasteners, snaps, buttons, hook-and-eye closures, etc., may be sufficient. Those with ordinary skill in the art will now appreciate that upon reading this specification and by their understanding the art of transport devices as described herein, methods of constructing transport devices will be understood by those knowledgeable in such art.

Bed 225 of carrier 155 may preferably be concave in shape and comprise at least one removable liner 435. Liner 435 may preferably comprise an absorbent core, thereby essentially providing comfort to a pet enclosed within carrier 155 and effectively containing excretions made by the pet enclosed within carrier 155. Liner 435 may comprise a single layer and may alternately be multi-layered. Liner 435 may be disposable and alternately reusable in order to meet the needs and preferences of a user. Upon reading this specification, it should be appreciated that, under appropriate circumstances, considering such issues as user preferences, design preference, structural requirements, marketing preferences, cost, available materials, technological advances, etc., other absorbent article arrangements such as, for example, cotton, bamboo, hemp, microfiber, cellulose wadding, etc., may be sufficient. Those with ordinary skill in the art will now appreciate that upon reading this specification and by their understanding the art of absorbent articles as described herein, methods of constructing absorbent articles will be understood by those knowledgeable in such art.

Carrier 155 preferably comprises a plurality of ventilation aperture(s) 440, which essentially act in a capacity of fresh air openings and viewing portals for a pet enclosed in carrier 155. In the present embodiment, front face 405, back face 410, right face 415, and left face 420 may each have at least one ventilation aperture 440. Alternatively, upper face 425 may also comprise at least one ventilation aperture 440. Characteristics of ventilation aperture(s) 440 such as size, shape, number, position, orientation, and the like are variable in order to suit the needs and preferences of a user. In preferred embodiments, ventilation aperture(s) 440 may exist as mesh-covered openings in carrier 155. Upon reading this specification, it should be appreciated that, under appropriate circumstances, considering such issues as user preferences, design preference, structural requirements, marketing preferences, cost, available materials, technological advances, etc., other window opening arrangements such as, for example, uncovered openings, bar-covered openings, etc., may be sufficient.

In preferred embodiments, carrier 155 may comprise a plurality of retractable flap(s) 445. At least one flap 445 may preferably be attached to front face 405, back face 410, right face 415, left face 420, and alternately upper face 425, in a manner so as to correspond to any ventilation aperture(s) 440 existing within carrier 155. In some embodiments, flap(s) 445 may be removably connected to carrier 155 to be stored when not in use. When in an extended state, each flap 445 may essentially cover and/or seal any corresponding ventilation aperture(s) 440. When in a retracted state, each flap 445 may essentially expose any corresponding ventilation aperture(s) 440. In either an extended or a retracted state, each flap 445 may preferably be secured by at least one fastener 450. Fastener(s) 450 of the present embodiment may comprise hook-and-loop fasteners. Upon reading this specification, it should be appreciated that, under appropriate circumstances, considering such issues as user preferences, design preference, structural requirements, marketing preferences, cost, available materials, technological advances, etc., other fastening and securing arrangements such as, for example, ties, clips, snaps, buttons, etc., may be sufficient.

To enhance storage capabilities of supply backpack with detachable pet carrier system 100, carrier 155 may comprise storage compartment(s) 335 and/or anchoring element(s) 340 within inner void 195 or along outside casing 160. In some embodiments, carrier 155 may be collapsible for storage. In yet other embodiments, carrier 155 may comprise integral expandable pockets to add to the overall size and capacity of carrier 155. In still other embodiments, carrier 155 may comprise securing means within inner void 195 to tether a pet enclosed within carrier 155 to prevent escape of the pet when upper face 425 and/or front face 405 are disengaged. Those with ordinary skill in the art will now appreciate that upon reading this specification and by their understanding the art of transport devices as described herein, methods of constructing transport devices will be understood by those knowledgeable in such art.

Supply backpack with detachable pet carrier system 100 may be sold as kit 240 comprising the following parts: at least one pack 105; at least one carrier 155; at least one carrying strap 150; at least one tote strap 198; and at least one set of user instructions. Supply backpack with detachable pet carrier system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
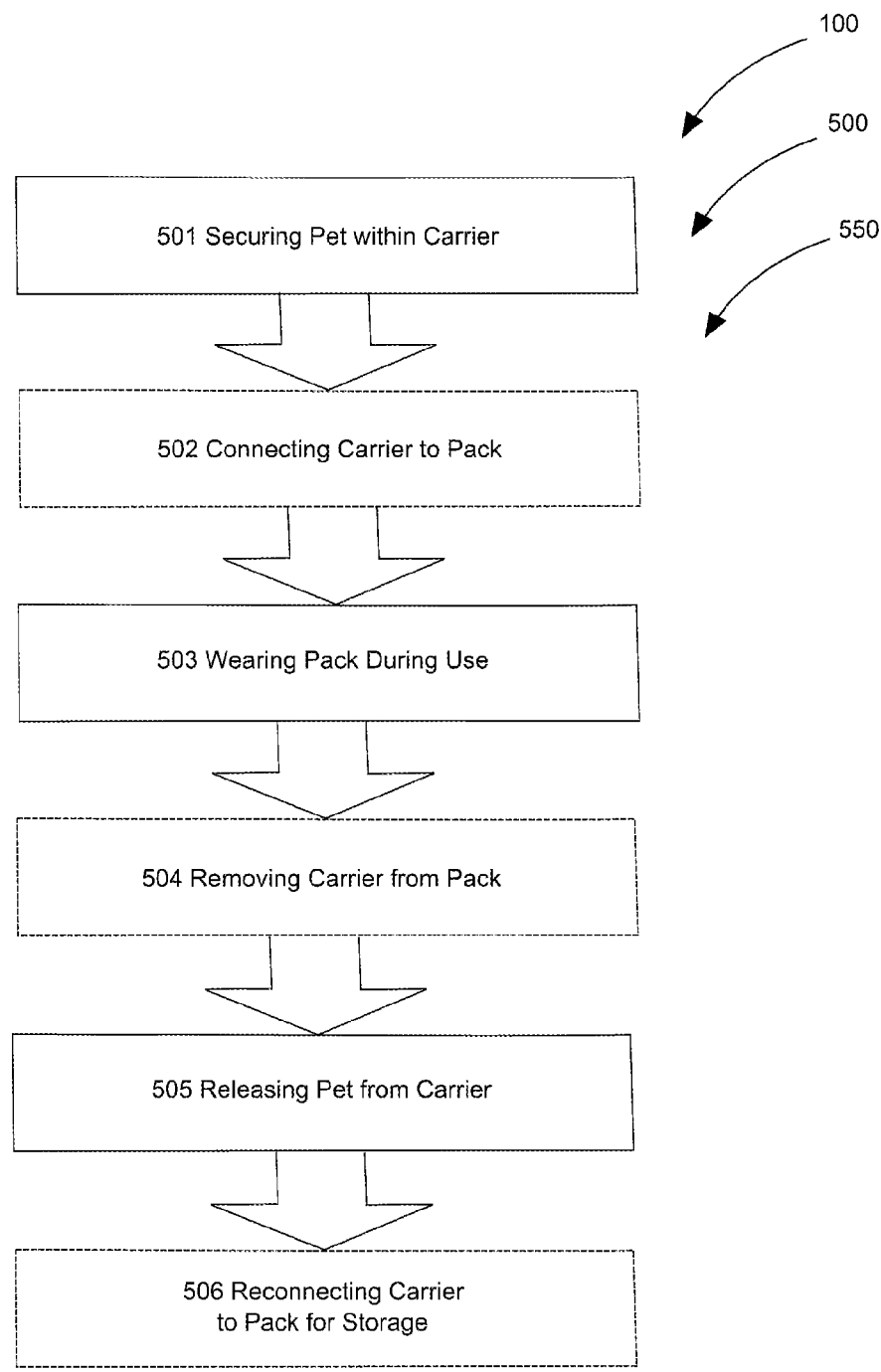
FIG. 5 is a flowchart illustrating a method of use for the supply backpack with detachable pet carrier system according to an embodiment of the present invention of FIGS. 1A-4C.

FIG. 5 is flowchart 550 illustrating method of use 500 for supply backpack with detachable pet carrier system 100 according to an embodiment of the present invention of FIGS. 1A-4C.

A method of using (at least hereby enabling method of use 500) a supply backpack with detachable pet carrier system 100 preferably comprises the steps of: step one 501 securing a pet within carrier 155; step two 502 connecting carrier 155 to pack 105; step three 503 wearing pack 105 for a period of use. The method of use 500 preferably further comprises the steps of: step four 504 removing carrier 155 from pack 105; step five 505 releasing the pet from carrier 155; and step six 506 reconnecting carrier 155 to pack 105 for storage until further use.

It should be noted that step two 502, step four 504, and step six 506 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A supply backpack with detachable pet carrier system comprising:
   a) a pack having;
      i) an outer shell;
      ii) an interior volume; and
      iii) a plurality of carrying straps; and
   b) a carrier having;
      i) an outside casing;
      ii) an inner void; and
      iii) a plurality of tote straps; and
   c) wherein said outer shell of said pack is defined by a forward wall, a rear wall, a right wall, a left wall, a bottom surface, and a top surface;
   d) whereby said a joining of said forward wall, said rear wall, said right wall, said left wall, said bottom surface, and said top surface defines said interior volume;
   e) wherein said forward wall of said pack is releasably engageable with at least one of said rear wall, said right wall, said left wall, said top surface, and said bottom surface of said pack;
   f) wherein said interior volume of said pack is accessible via a disengagement of said forward wall from at least one of said rear wall, said right wall, said left wall, said top surface, and alternately said bottom surface of said pack;
   g) wherein said outside casing of said carrier is defined by a front face, a back face, a right face, a left face, a bed and an upper face;
   h) whereby a joining of said front face, said back face, said right face, said left face, said bed, and said upper face defines said inner void;
   i) wherein said upper face and said front face of said carrier are each releasably engageable with at least one of said back face, said right face, said left face, and alternately said bed;
   j) wherein said inner void of said carrier is accessible via a disengagement of said upper face and said front face from at least one of said back face, said right face, said left face, and alternately said bed of said carrier;
   k) wherein said top surface of said pack and said bed of said carrier are removably coupleable one to another via at least one connector;
   l) wherein said bed of said carrier comprises an attacher;
   m) wherein said top surface of said pack comprises a receiver;
   n) wherein said top surface of said pack comprises a lip to provide stability to a joining of said carrier and said pack;
   o) wherein said carrier is removably attachable to said pack; and
   p) whereby a pet is securable in said carrier and said carrier is securable to said pack so as to provide protection and transport of said pet for a duration of at least one use.

2. The supply backpack with detachable pet carrier system of claim 1 wherein said pack comprises a plurality of interior storage compartments.

3. The supply backpack with detachable pet carrier system of claim 1 wherein said pack comprises a plurality of exterior anchoring elements.

4. The supply backpack with detachable pet carrier system of claim 1 wherein said bed of said carrier comprises a removable liner.

5. The supply backpack with detachable pet carrier system of claim 1 wherein both said pack and said carrier are waterproof.

6. The supply backpack with detachable pet carrier system of claim 1 wherein said carrying straps of said pack are adjustable and removable.

7. The supply backpack with detachable pet carrier system of claim 1 wherein said tote straps of said carrier are adjustable and removable.

8. The supply backpack with detachable pet carrier system of claim 6 wherein said carrying straps are releasably attachable to said pack in such a manner as to allow a configuration of attachment of said carrying straps to said pack to be altered; similarly, said tote straps are releasably attachable to said carrier in such a manner as to allow a configuration of attachment of said tote straps to said carrier to be altered.

9. The supply backpack with detachable pet carrier system of claim 1 wherein said carrier comprises a plurality of ventilation apertures.

10. The supply backpack with detachable pet carrier system of claim 9 wherein said carrier comprises a plurality of flaps attached to at least one of said front face, said back face, said right face, said left face, and alternately said upper face.

11. The supply backpack with detachable pet carrier system of claim 10 wherein each said flap essentially covers any ventilation apertures existing in said front face, said back face, said right face, said left face, and alternately said upper face.

12. The supply backpack with detachable pet carrier system of claim 11 wherein each said flap is retractable to essentially expose each ventilation aperture existing in said front face, said back face, said right face, said left face, and alternately said upper face.

13. The supply backpack with detachable pet carrier system of claim 12 wherein each retracted said flap is securable by at least one fastener.

14. A supply backpack with detachable pet carrier system comprising:
   a) a pack having;
      i) an outer shell;
      ii) an interior volume; and
      iii) a plurality of adjustable and removable carrying straps; and
   b) a carrier having;
      i) an outside casing;
      ii) an inner void; and
      iii) a plurality of adjustable and removable tote straps; and c) wherein said outer shell of said pack is defined by a forward wall, a rear wall, a right wall, a left wall, a bottom surface, and a top surface;
d) whereby said a joining of said forward wall, said rear wall, said right wall, said left wall, said bottom surface, and said top surface defines said interior volume;
e) wherein said forward wall of said pack is releasably engageable with at least one of said rear wall, said right wall, said left wall, said top surface, and said bottom surface of said pack;
f) wherein said interior volume of said pack is accessible via a disengagement of said forward wall from at least one of said rear wall, said right wall, said left wall, said top surface, and alternately said bottom surface of said pack;
g) wherein said outside casing of said carrier is defined by a front face, a back face, a right face, a left face, a bed and an upper face;
h) whereby a joining of said front face, said back face, said right face, said left face, said bed, and said upper face defines said inner void;
i) wherein said upper face and said front face of said carrier are each releasably engageable with at least one of said back face, said right face, said left face, and alternately said bed;
j) wherein said inner void of said carrier is accessible via a disengagement of said upper face and said front face from at least one of said back face, said right face, said left face, and alternately said bed of said carrier;
k) wherein said carrier is removably attachable to said pack via at least one connector;
l) wherein said bed of said carrier comprises an attacher;
m) wherein said top surface of said pack comprises both a receiver for securing said carrier and a lip for stabilizing said carrier;
n) wherein said pack comprises a plurality of both interior storage compartments and exterior anchoring elements;
o) wherein said carrier comprises a plurality of ventilation apertures;
p) wherein said carrier comprises a plurality of retractable flaps attachable to at least one of said front face, said back face, said right face, said left face, and
q) alternately said upper face for covering and alternately exposing said ventilation flaps;
r) wherein each retracted said flap is securable by at least one fastener; and
s) whereby a pet is securable in said carrier and said carrier is securable to said pack so as to provide protection and transport of said pet for a duration of at least one use.

15. A method of using the supply backpack with detachable pet carrier system of claim 14 comprising the steps of:
   a) securing a pet within a carrier;
   b) connecting said carrier to a pack; and
   c) wearing said pack for a period of use.

16. The method of claim 15 further comprising the steps of:
   a) removing said carrier from said pack;
   b) releasing said pet from said carrier; and
   c) reconnecting said carrier to said pack for storage until further use.

* * * * *